J. ST. L. MAHER.
AUTOMOBILE REAR AXLE.
APPLICATION FILED JUNE 16, 1917.
1,271,742. Patented July 9, 1918.
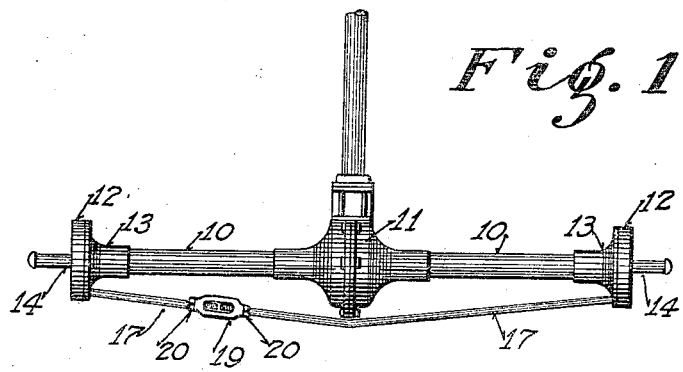
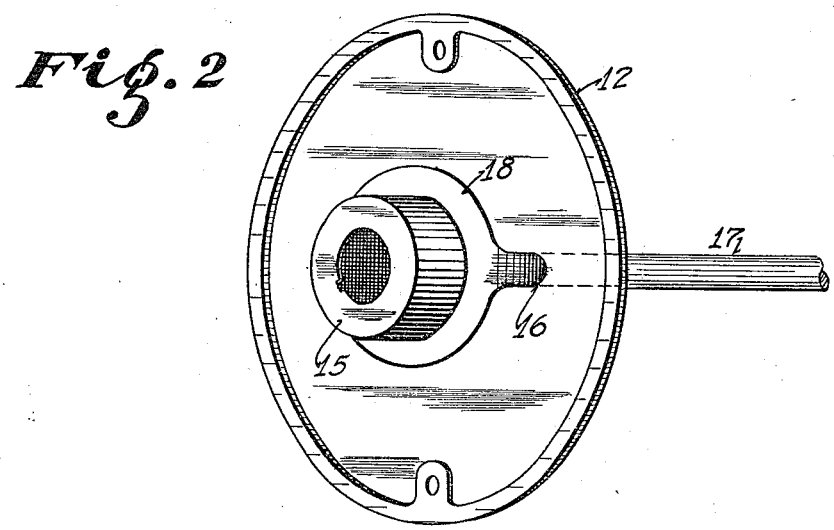
INVENTOR
Jeremiah St. L. Maher,
BY
James L. Hopkins,
ATTORNEY.

UNITED STATES PATENT OFFICE.

JEREMIAH ST. L. MAHER, OF ST. LOUIS, MISSOURI.

AUTOMOBILE REAR AXLE.

1,271,742.   Specification of Letters Patent.   Patented July 9, 1918.

Application filed June 16, 1917. Serial No. 175,093.

*To all whom it may concern:*

Be it known that I, JEREMIAH ST. L. MAHER, a citizen of the United States, residing at the city of St. Louis and State of Missouri, have invented certain new and useful Improvements in Automobile Rear Axles, of which the following is a specification, reference being had therein to the accompanying drawing.

My invention relates to improvements in automobile rear axles and has for its object to provide a protective and strengthening frame for the rear axle of an automobile, embodying a truss-rod whose terminals are mounted on the outer faces of the roller bearing housings.

In the drawings—

Figure 1 is a plan view of a structure embodying my invention.

Fig. 2 is an enlarged perspective view of one of the terminals of the axle-inclosing structure of my invention.

As shown in the drawings, the structure of my invention includes a tubular housing 10, at the center of which is the driving-gear box 11. At the extremities of the tubular housing 10 the concave disks 12 are mounted, by means of collars 13. The structure thus described is old in the art, and is intended to inclose and carry a sectional axle 14—14, roller-bearing housings 15 being mounted concentrically in the disks 12—12.

It is the object of my invention to reinforce and strengthen the structure thus described, to which end each of the disks 12 is provided with the perforation 16 to receive the truss-rod 17. The truss-rod 17 is provided at each terminal with an eye 18 adapted to fit closely about the roller-bearing housing 15, as shown in Fig. 2, and said truss-rod 17 is further made adjustable by means of the turn buckle 19 and lock-nuts 20—20.

By means of the described construction the stress created by the truss-rod 17 is applied to the axle 14, as nearly as practicable, at the extreme ends of said axle 14, and as near the wheels (not shown) driven by said axle 14 as said stress can be applied. The nature of the described structure is such that the truss-rod 17, or either section thereof, may be readily removed for purposes of replacing or repair.

In practice I prefer to place the truss-rod 17 directly beneath the axle 14, and in the same vertical plane as said axle 14. By so locating the truss-rod it is directly opposed to the load carried by the vehicle and serves to keep the axle-sections 14—14 in practically perfect alinement.

Having thus described my invention, what I claim as new and desire to have secured to me by the grant of Letters Patent, is—

1. In an automobile rear axle, in combination, a tubular housing; a driving-gear-box at the center of said housing; two convex disks mounted at the ends of said housing; an axle mounted in the housing; a roller bearing housing concentrically mounted on the outer side of each of said disks; and a truss-rod having an eye at each end to encircle one of said roller-bearing housings.

2. In an automobile rear axle, in combination, a tubular housing; a driving-gear-box at the center of said housing; two convex disks mounted at the ends of said housing; an axle mounted in the housing; a roller-bearing housing concentrically mounted on the outer side of each of said disks; a truss-rod having an eye at each end to encircle one of said roller-bearing housings; and means for adjusting the length of said truss-rod.

In testimony whereof I hereunto affix my signature.

JEREMIAH ST. L. MAHER.

Copies of this patent may be obtained for five cents each, by addressing the "Commissioner of Patents, Washington, D. C."